Patented Jan. 15, 1929.

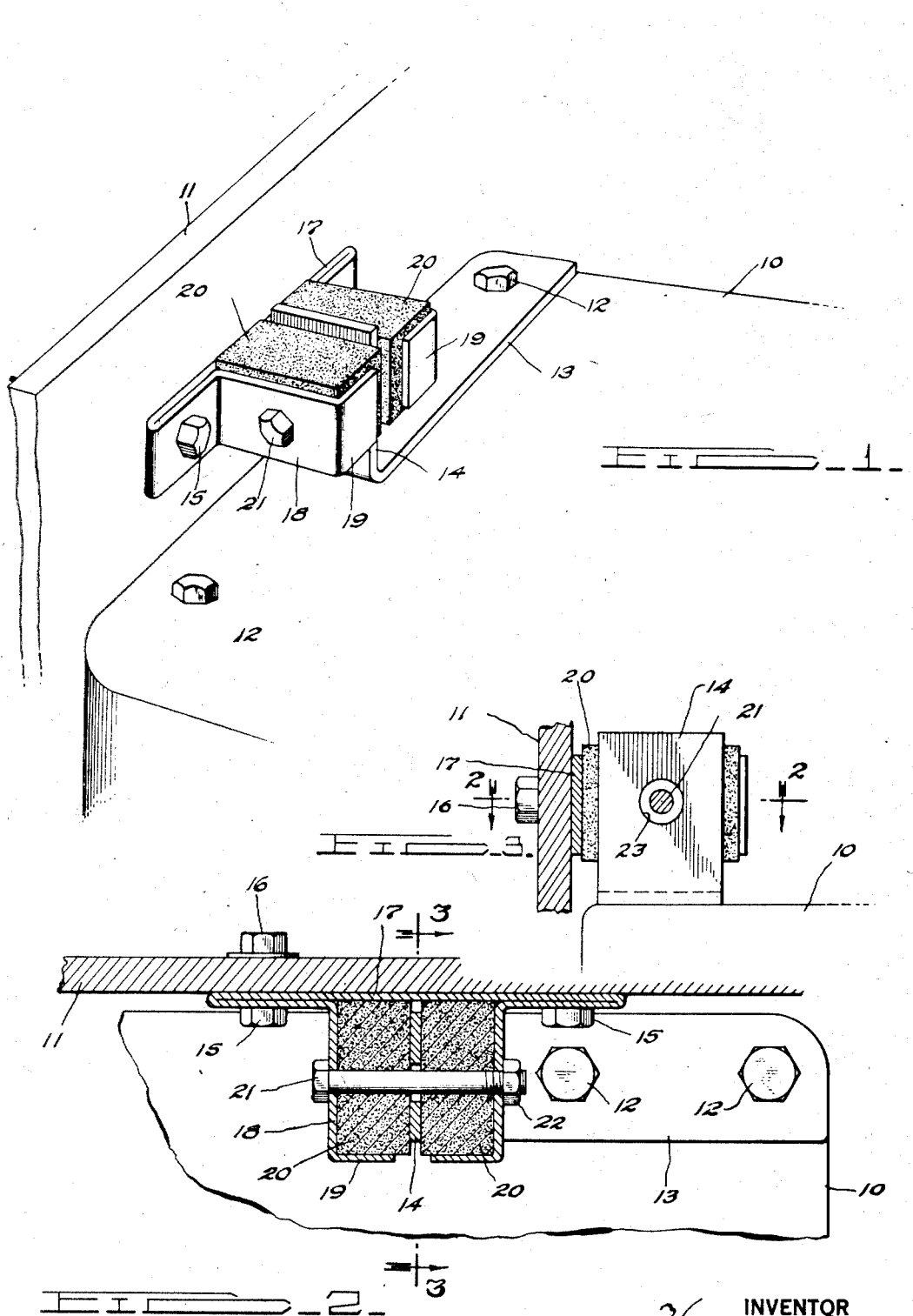

1,699,332

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

ENGINE.

Application filed December 4, 1926. Serial No. 152,690.

This invention relates to motor vehicles and particularly to means for preventing torque reactions of the motor or engine from being apparent to the occupant of the vehicle of which it forms a part.

The principal object is to provide means for resiliently damping excessive movement of the engine of a motor vehicle caused by synchronization of the natural period of vibration of the engine support with the explosions in the engine.

Another object is to provide a damping connection between the engine of a motor vehicle and the part stationary with respect to the frame thereof.

Another object is to provide in combination with the motor vehicle, a part stationary with respect to the engine thereof resiliently restrained against movement by a part secured to the dash of said vehicle.

Another object is to provide in combination with a motor vehicle, a plate secured to said engine and relatively stationary with respect thereto, said plate being provided with a projecting portion received between a pair of resilient blocks secured against movement to the dash of said vehicle.

A further object is to provide in combination with a motor vehicle, a member secured to the engine thereof provided with an upwardly extending portion, a pair of rubber blocks being immovably secured to the dash of said vehicle in position to embrace said upwardly extending portion therebetween, and means co-acting with said upwardly extending portion and said rubber blocks to prevent displacement of said parts in respect to each other.

The above being among the objects of the present invention, the same consists in certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views, Figure 1 is a fragmentary perspective view of a motor vehicle engine and dash showing a preferable embodiment of the present invention associated therewith.

Figure 2 is a horizontal sectional view taken centrally through the rubber block shown secured to the dash in Figure 1, as on the line 2—2 of Figure 3.

Figure 3 is a sectional view taken on the line 3—3 of Figure 2.

It is desirable in motor vehicle construction that the engine be flexibly mounted in order that torque reaction due to the separate explosions in the engine will not be transmitted suddenly and with full force to the chassis and the torque reaction be apparent to the occupant of the vehicle as noticeable impulses or vibration.

However, when such a yielding engine support is employed, at certain speeds of the engine the number of explosions per unit of time therein corresponds to the natural period of vibration of its support, in which case the reaction in the motor due to the explosion synchronizes with the natural period of vibration of its support and a very apparent and noticeable vibration of the whole engine becomes apparent. The present invention deals with means for preventing this apparent vibration of the engine due to such synchronization from being apparent to the occupant of the vehicle of which the engine forms a part. I do this by resiliently damping such synchronized movement of the engine, and this is accomplished by immovably securing to the engine a part having an extending portion, and providing a device secured to the dash of the vehicle co-operatively associated with such extending portion and resiliently engaging the same, whereby any movement of the engine relative to the dash is resiliently restrained.

As illustrative of the present invention, I show in Figure 1 a fragmentary perspective view of a motor vehicle engine 10 and associated dash 11. Secured adjacent to the rear edge of the cylinder head of the engine 10 by conventional cylinder head bolts 12, is a plate 13 terminating at one end in an upwardly projecting portion 14. Secured to the dash 11 by bolts 15 and nuts 16 in adjacent relationship with the upwardly projecting portion 14, is a bracket comprising a base 17 and forwardly extending spaced side portions 18 terminating in inwardly extending marginal flange portions 19. Received between the side portion 18 and between the marginal portion 19 and base 17 are two rubber blocks 20 which embrace the upwardly extending portion 14 therebetween.

A bolt 21 secured in place by the nut 22 extends through the side portions 18 and through the rubber blocks 20, an enlarged opening 23 being provided in the upwardly extending portion 14 for passage of said bolt 21 with ample clearance therearound.

The rubber blocks 20 are of such resilient nature that the normal small movement of the engine 10 due to its yielding support is not interfered with, but when the explosions in the engine 10 synchronize with the natural period of vibration of the engine support, the resulting excessive movement of the engine 10 with respect to the dash 11 is resiliently restrained and prevented from reaching such an amplitude as to be apparent to the occupant of the vehicle of which the engine 10 forms a part. It will be evident that the size and the resiliency of the blocks 20 will necessarily have to be varied in adapting the present invention to vehicles of different construction in order to obtain the most advantageous results, but such may be determined by experimentation and is within the scope of any ordinary workman skilled in this art. In the present construction shown, the damping characteristics may be varied by drawing the nut 22 up on the bolt 21, thus compressing the rubber block 20 and thereby changing the resilient characteristics thereof.

Although but one embodiment of the present invention is shown in the accompanying drawing, it will be apparent that the invention is subject to various modifications, and formal changes may be made in the specific embodiment shown without departing from the spirit and substance of the above invention, the scope of which is commensurate with the appended claims.

What I claim is:

1. In combination with the engine and dash of a motor vehicle, a plate secured to said engine relatively stationary with respect thereto, said plate being provided with a projecting portion, and a pair of resilient blocks secured against movement to said dash, clamping said projecting portion therebetween.

2. In combination with the engine and dash of a motor vehicle, a bracket carried by said dash, a member carried by said engine provided with a projecting portion, and resilient means interposed between said bracket and said projecting part.

3. In combination with the engine and dash of a motor vehicle, a part secured against movement to said dash provided with a pair of yielding surfaces, a part secured against movement to said engine provided with a projecting portion, and means for clamping said projecting portion between said yielding surfaces.

4. In combination with the engine and dash of a motor vehicle, a bracket secured to said dash provided with a pair of spaced forwardly extending walls, a member secured to said engine provided with an upwardly projecting portion received between said forwardly projecting walls, and resilient material interposed between said walls and said upwardly projecting portion for yieldingly engaging said projecting portion of said member.

5. In combination with the engine and dash of a motor vehicle, a bracket secured against movement to said dash provided with a pair of rubber blocks, a member secured against movement of said engine provided with a projecting portion, said projecting portion being received between said blocks, and means for preventing displacement of said rubber blocks in respect to said bracket and said projecting portion.

6. In combination with the engine and dash of a motor vehicle, a bracket secured to said dash provided with a pair of forwardly extending spaced walls, a pair of rubber blocks confined between said walls, a member secured to said engine provided with a projecting portion interposed between said rubber blocks, and a bolt extending through said walls for varying the spaced relation thereof whereby to control the resilient characteristics of said rubber blocks.

Signed by me at Detroit, Michigan, this 29 day of November, 1926.

VINCENT LINK.